United States Patent
Glover et al.

(10) Patent No.: US 12,556,854 B2
(45) Date of Patent: Feb. 17, 2026

(54) HEARING DOSE RECORDING SYSTEMS; HEARING DOSE RECORDING HEADPHONES

(71) Applicant: LIMITEAR LTD., London (GB)

(72) Inventors: Richard Glover, London (GB); Stephen Wheatley, London (GB)

(73) Assignee: LIMITEAR LTD., London (GB)

( * ) Notice: Subject to any disclaimer, the term of this patent is extended or adjusted under 35 U.S.C. 154(b) by 192 days.

(21) Appl. No.: 18/019,696

(22) PCT Filed: Aug. 5, 2021

(86) PCT No.: PCT/GB2021/052033
§ 371 (c)(1),
(2) Date: Feb. 3, 2023

(87) PCT Pub. No.: WO2022/029442
PCT Pub. Date: Feb. 10, 2022

(65) Prior Publication Data
US 2023/0362528 A1   Nov. 9, 2023

(30) Foreign Application Priority Data
Aug. 5, 2020 (GB) ...................... 2012190

(51) Int. Cl.
*H04R 1/10* (2006.01)
*G06F 3/16* (2006.01)
*H04R 25/00* (2006.01)

(52) U.S. Cl.
CPC ......... *H04R 1/1041* (2013.01); *H04R 25/554* (2013.01); *G06F 3/165* (2013.01); *H04R 2430/01* (2013.01)

(58) Field of Classification Search
CPC ..................... H04R 1/1041; H04R 25/554
See application file for complete search history.

(56) References Cited

U.S. PATENT DOCUMENTS

| 9,503,829 B2 | 11/2016 | Baskaran et al. |
| 2008/0137873 A1* | 6/2008 | Goldstein ............ H04R 1/1083 381/57 |

(Continued)

FOREIGN PATENT DOCUMENTS

WO   2010022349 A1   2/2010

OTHER PUBLICATIONS

International Search Report, dated Feb. 14, 2022, issued in priority International Application No. PCT/GB2021/052033.

*Primary Examiner* — Fan S Tsang
(74) *Attorney, Agent, or Firm* — Saul Ewing LLP

(57) ABSTRACT

A system including wireless headphones, a computer, and software stored on the computer, the computer configured to communicate wirelessly with the wireless headphones, wherein the wireless headphones are configured to provide audio output, to quantify hearing dose associated with the audio output, and to record the quantified hearing dose on the wireless headphones in a quantified hearing dose record during a first period when the wireless headphones are not in wireless communication with the computer; wherein the software is executable on the computer such that in response to the wireless headphones being in wireless communication with the computer following the first period, the software is executable to receive from the wireless headphones the quantified hearing dose record corresponding to the first period, and to store the received quantified hearing dose record in a hearing dose record on the computer. Related systems, headphones and computer program products are provided.

22 Claims, 6 Drawing Sheets

(56) References Cited

U.S. PATENT DOCUMENTS

| | | | |
|---|---|---|---|
| 2010/0046767 A1* | 2/2010 | Bayley | G01H 3/14 381/59 |
| 2010/0135502 A1 | 6/2010 | Keady et al. | |
| 2010/0141439 A1* | 6/2010 | Lunner | G01H 3/14 340/540 |
| 2012/0051555 A1 | 3/2012 | Schevciw et al. | |

* cited by examiner

| Linear | dBA SPL | hexadecimal |
|---|---|---|
| 1 | 30.0 | 00000001 |
| 10 | 40.0 | 0000000A |
| 100000 | 80.0 | 000186A0 |
| 1000000000 | 120.0 | 369ACA00 |
| 4294967295 | 126.3 | FFFFFFFF |

FIGURE 4

| seconds ago: | Linear | dBA SPL | | 30-sec periods ago | minutes ago | Linear | dBA SPL |
|---|---|---|---|---|---|---|---|
| 1 | 10000 | 70 | | 1 | 0.5 | 10000 | 70.0 |
| 2 | 10000 | 70 | | 2 | 1.0 | 100000 | 80.0 |
| 3 | 10000 | 70 | | 3 | 1.5 | 100000 | 80.0 |
| 4 | 10000 | 70 | | 4 | 2.0 | 100000 | 80.0 |
| 5 | 10000 | 70 | | 5 | 2.5 | 100000 | 80.0 |
| 6 | 10000 | 70 | | 6 | 3.0 | 100000 | 80.0 |
| 7 | 10000 | 70 | | 7 | 3.5 | 100000 | 80.0 |
| 8 | 10000 | 70 | | 8 | 4.0 | 100000 | 80.0 |
| 9 | 10000 | 70 | | 9 | 4.5 | 100000 | 80.0 |
| 10 | 10000 | 70 | | 10 | 5.0 | 370000 | 85.7 |
| 11 | 1000000 | 90 | | 11 | 5.5 | 400000 | 86.0 |
| 12 | 1000000 | 90 | | 12 | 6.0 | 400000 | 86.0 |
| 13 | 1000000 | 90 | | 13 | 6.5 | 400000 | 86.0 |
| 14 | 1000000 | 90 | | 14 | 7.0 | 400000 | 86.0 |
| 15 | 1000000 | 90 | | 15 | 7.5 | 100000 | 80.0 |
| 16 | 1000000 | 90 | | 16 | 8.0 | 100000 | 80.0 |
| 17 | 1000000 | 90 | | 17 | 8.5 | 100000 | 80.0 |
| 18 | 1000000 | 90 | | 18 | 9.0 | 100000 | 80.0 |
| 19 | 1000000 | 90 | | 19 | 9.5 | 100000 | 80.0 |
| 20 | 1000000 | 90 | | 20 | 10.0 | 100000 | 80.0 |
| 21 | 100000 | 80 | | 21 | 10.5 | 100000 | 80.0 |
| 22 | 100000 | 80 | | 22 | 11.0 | 100000 | 80.0 |
| 23 | 100000 | 80 | | 23 | 11.5 | 10000 | 70.0 |
| 24 | 100000 | 80 | | 24 | 12.0 | 10000 | 70.0 |
| 25 | 100000 | 80 | | 25 | 12.5 | 10000 | 70.0 |
| 26 | 100000 | 80 | | 26 | 13.0 | 10000 | 70.0 |
| 27 | 100000 | 80 | | 27 | 13.5 | 10000 | 70.0 |
| 28 | 100000 | 80 | | 28 | 14.0 | 10000 | 70.0 |
| 29 | 100000 | 80 | | 29 | 14.5 | 10000 | 70.0 |
| 30 | 100000 | 80 | | 30 | 15.0 | 10000 | 70.0 |
| Average | 370000 | 85.7 | | | Average | 119000 | 80.8 |

FIGURE 5

| 15-min periods ago | hrs ago | Linear | dBA SPL | | 8hr periods ago | days ago | Linear | dBA SPL |
|---|---|---|---|---|---|---|---|---|
| 1 | 0.25 | 10000 | 70.0 | | 1 | 0.3 | 10000 | 70.0 |
| 2 | 0.5 | 100000 | 80.0 | | 2 | 0.7 | 100000 | 80.0 |
| 3 | 0.75 | 100000 | 80.0 | | 3 | 1.0 | 100 | 50.0 |
| 4 | 1 | 100000 | 80.0 | | 4 | 1.3 | 100000 | 80.0 |
| 5 | 1.25 | 100000 | 80.0 | | 5 | 1.7 | 300000 | 84.8 |
| 6 | 1.5 | 100000 | 80.0 | | 6 | 2.0 | 100 | 50.0 |
| 7 | 1.75 | 100000 | 80.0 | | 7 | 2.3 | 100000 | 80.0 |
| 8 | 2 | 100000 | 80.0 | | 8 | 2.7 | 100000 | 80.0 |
| 9 | 2.25 | 100000 | 80.0 | | 9 | 3.0 | 100 | 50.0 |
| 10 | 2.5 | 370000 | 85.7 | | 10 | 3.3 | 370000 | 85.7 |
| 11 | 2.75 | 400000 | 86.0 | | 11 | 3.7 | 400000 | 86.0 |
| 12 | 3 | 400000 | 86.0 | | 12 | 4.0 | 100 | 50.0 |
| 13 | 3.25 | 400000 | 86.0 | | 13 | 4.3 | 400000 | 86.0 |
| 14 | 3.5 | 400000 | 86.0 | | 14 | 4.7 | 400000 | 86.0 |
| 15 | 3.75 | 100000 | 80.0 | | 15 | 5.0 | 100 | 50.0 |
| 16 | 4 | 100000 | 80.0 | | 16 | 5.3 | 100000 | 80.0 |
| 17 | 4.25 | 100000 | 80.0 | | 17 | 5.7 | 100000 | 80.0 |
| 18 | 4.5 | 100000 | 80.0 | | 18 | 6.0 | 100 | 50.0 |
| 19 | 4.75 | 100000 | 80.0 | | 19 | 6.3 | 100000 | 80.0 |
| 20 | 5 | 100000 | 80.0 | | 20 | 6.7 | 100000 | 80.0 |
| 21 | 5.25 | 100000 | 80.0 | | 21 | 7.0 | 100 | 50.0 |
| 22 | 5.5 | 10000 | 70.0 | | | | | |
| 23 | 5.75 | 10000 | 70.0 | | | | | |
| 24 | 6 | 10000 | 70.0 | | | | | |
| 25 | 6.25 | 10000 | 70.0 | | | | | |
| 26 | 6.5 | 10000 | 70.0 | | | | | |
| 27 | 6.75 | 10000 | 70.0 | | | | | |
| 28 | 7 | 10000 | 70.0 | | | | | |
| 29 | 7.25 | 10000 | 70.0 | | | | | |
| 30 | 7.5 | 10000 | 70.0 | | | | | |
| 31 | 7.75 | 10000 | | | | | | |
| 32 | 8 | 10000 | 70 | | | | | |
| | Average | 112188 | 80.5 | | | Average | 127652.4 | 81.1 |

FIGURE 6

HEARING DOSE RECORDING SYSTEMS; HEARING DOSE RECORDING HEADPHONES

CROSS REFERENCE TO RELATED APPLICATIONS

This application claims the priority of International Application No. PCT/GB2021/052033, filed on Aug. 5, 2021, which claims priority to GB Application No. GB 2012190.1, filed on Aug. 5, 2020, the entire contents of which are fully incorporated herein by reference.

BACKGROUND OF THE INVENTION

1. Field of the Invention

The field of the invention relates to hearing dose recording systems, to hearing dose recording headphones, and to associated computer program products.

2. Technical Background

Noise-induced-hearing-loss (NIHL) in humans is a significant problem which the World Health Organisation (WHO) and the International Telecommunications Union (ITU) have been making concerted efforts to publicise and to encourage manufacturers, nations, retailers and users to rectify. An example is the Make Listening Safe campaign of the WHO. Most effort is directed at possible NIHL relating to the large increase in portable, recreational media playing devices, of which today the main example is the mobile handset (e.g. smartphone).

3. Discussion of Related Art

One ITU standard embodying WHO/ITU efforts is H.870. Much of this standard is based on the energy-limitation approach embodied in International Electrical Committee (IEC)'s product safety standard IEC 62368-1:2018 together with its associated family of standards. The focus of these standards has been to ensure these portable players employ techniques to reduce if not eliminate NIHL arising from their use. The WHO/ITU standard is based on estimation of the accumulated hearing dose, and the IEC standard strongly encourages the same approach and gives an indication this may be mandatory in a future edition of the standard.

WO2016079513A1 discloses a portable programmable device including a battery, a memory and a terminal connectable to earpieces, the device including in the memory a calibration file, parameter or parameters relating to audio sensitivity of the earpieces, the device being configured to play media data including audio, and to provide audio output to the earpieces, the device being further configured to, using the calibration file, parameter or parameters, calculate a noise dose relating to a sound exposure of a user resulting from audio output provided to the earpieces, and to record the noise dose on the device, wherein the device is configured to adjust audio output level in response to:

(a) audio content included in played media data;
(b) the calibration file, parameter or parameters, and
(c) noise dose data of the user recorded on the device.

SUMMARY OF THE INVENTION

According to a first aspect of the invention, there is provided a system including first wireless headphones, a computer, and software stored on the computer, the computer configured to communicate wirelessly with the first wireless headphones, wherein the first wireless headphones are configured to provide audio output, to quantify hearing dose associated with the audio output, and to record the quantified hearing dose on the first wireless headphones in a quantified hearing dose record during a first period when the first wireless headphones are not in wireless communication with the computer;

wherein the software is executable on the computer such that in response to the first wireless headphones being in wireless communication with the computer following the first period, the software is executable to receive from the first wireless headphones the quantified hearing dose record corresponding to the first period, and to store the received quantified hearing dose record in a hearing dose record on the computer.

An advantage is that if audio output is provided when the first wireless headphones are not in wireless communication with the computer, a quantified hearing dose record is stored in a hearing dose record on the computer. An advantage is that a user's hearing can be protected based on use of wireless headphones when they are not in wireless communication with the computer which stores the hearing dose record.

A quantified hearing dose record will typically include multiple records of distinct periods; an example is a time sequence of hearing dose measured as a function of time, e.g. in each second. Such a quantified hearing dose record is to be distinguished from systems in which only a single value represents all of a hearing dose history.

The system may be one wherein during the first period the first wireless headphones provide the audio output using media including audio, the media stored on the first wireless headphones.

The system may be one wherein during the first period the first wireless headphones provide the audio output using audio data provided by a playing device in wireless communication with the first wireless headphones, in which the playing device is not the computer.

The system may be one wherein the playing device that is not the computer is a portable device, or a non-portable device.

The system may be one wherein the computer is a portable device. An advantage is that the user's hearing can be protected for listening activities during mobile activities.

The system may be one wherein the computer that is a portable device is a smartphone, a tablet computer, a laptop computer, or a recreational media playing device.

The system may be one wherein the computer is a non-portable device, such as a desktop computer, a smart TV or a games console.

The system may be one wherein the software is executable to synchronize the hearing dose record on the computer with a hearing dose record on the first wireless headphones. An advantage is that a complete hearing dose record may be replicated, which means that the hearing dose record is not lost, if one of the computer or the first wireless headphones becomes inoperative or permanently unavailable.

The system may be one wherein any gaps in the dose records in either the computer or the first wireless headphones are filled by the synchronization.

The system may be one wherein any dose records that are present on the computer but which are not present on the first wireless headphones are copied from the computer to the first wireless headphones during the synchronization, for example for a user identity. An advantage is that a user's hearing can be protected using the records when the first wireless headphones are not in wireless communication with the computer.

The system may be one wherein any dose records that are present on the first wireless headphones but which are not present on the computer are copied from the first wireless headphones to the computer during the synchronization, for example for a user identity. An advantage is that the copied records are available to the software to protect a user's hearing.

The system may be one wherein synchronisation is performed in the background. An advantage is that user activity using the first wireless headphones is not impacted.

The system may be one wherein the software is executable to receive a selection of a user, such that the synchronization is performed for a hearing dose record of the user on the computer, with a hearing dose record on the first wireless headphones. An advantage is that a hearing dose record on the first wireless headphones can be allocated to a user record on the computer.

The system may be one wherein the software is executable to receive an identity code in the first wireless headphones, and thereafter to use the received identity code such that the synchronization is performed for the hearing dose record of a user on the computer associated with the received identity code, with a hearing dose record on the first wireless headphones. An advantage is that a hearing dose record on the first wireless headphones is allocated to a user record on the computer. An advantage is that a user's hearing can be protected using the records when the first wireless headphones are not in wireless communication with the computer.

The system may be one wherein synchronisation events include remapping records with differing sample periods.

The system may be one wherein the software is executable to configure the first wireless headphones with a user identity code, such that hearing dose history records in the first wireless headphones which are received by the computer together with the user identity code, are collated in the computer into a user hearing history record corresponding to the user identity code. An advantage is that a hearing dose record on the first wireless headphones can be allocated to a user record on the computer.

The system may be one wherein the software is an app downloadable from an app store, or is locked into the computer, or is incorporated into an operating system of the computer.

The system may be one wherein a plurality of dose history records corresponding to a plurality of different users are stored on the computer.

The system may be one wherein each of the plurality of dose history records corresponds to a user profile which is established using the software.

The system may be one wherein only one dose history record corresponding to one user is present on the first wireless headphones. An advantage is that available memory present in the first wireless headphones is dedicated to use in protecting the hearing of the one user.

The system may be one wherein the hearing dose record on the first wireless headphones is limited to a shorter period of time (e.g. a most recent shorter period of time) than the hearing dose record on the computer. An advantage is that available memory present in the first wireless headphones can be dedicated to the most pertinent use in protecting the hearing of the one user.

The system may be one wherein the hearing dose record on the first wireless headphones is not limited to a shorter period of time than the hearing dose record on the computer. An advantage is that a complete hearing dose record may be replicated, which means that the hearing dose record is not lost, if one of the computer or the first wireless headphones becomes inoperative or permanently unavailable.

The system may be one wherein the hearing dose record on the first wireless headphones is for at least 7 days, or is for at least one month.

The system may be one wherein the first wireless headphones are configured to monitor hearing dose during a first predefined period (e.g. a week) using the hearing dose record on the first wireless headphones and to take remedial action (e.g. limit audio output level, or issue a warning) if a hearing dose during the first predefined period exceeds a first predefined level. An advantage is protection of user hearing.

The system may be one wherein the first wireless headphones takes the remedial action, even when out of communication with any other device.

The system may be one wherein the first wireless headphones takes the remedial action, so as to meet regulatory or advisory requirements.

The system may be one wherein the issuing a warning includes one or more of providing audio cues, visual indications, voice messages, or haptic events.

The system may be one wherein the issuing a warning includes issuing a warning via the computing device when the computing device is in connection with the first wireless headphones.

The system may be one wherein the first predefined level is based on an integration of A-weighted energy content of the delivered acoustic signal, for example as modified by the acoustic characteristics of the headset and user combination often referred to as head-related-transfer-function (HRTF).

The system may be one wherein the first wireless headphones are configured to monitor hearing dose during a second predefined period (e.g. 24 hours) using the hearing dose record on the first wireless headphones and to take remedial action (e.g. limit audio output level, or issue a warning) if the hearing dose during the second predefined period exceeds a second predefined level. An advantage is improved protection of user hearing. In an example, the first predefined period is longer than the second predefined period.

The system may be one wherein the second predefined level is based on an integration of A-weighted energy content of the delivered acoustic signal, for example as modified by the acoustic characteristics of the headset and user combination often referred to as head-related-transfer-function (HRTF).

The system may be one wherein a monitoring point is near to or at the headphone chip's output to an acoustic driver. An advantage is accurate assessment of user hearing dose.

The system may be one wherein a monitoring point is an in-ear microphone being used for feedback/hybrid monitoring, with a parallel path of specific filtering for dose-monitoring. An advantage is accurate assessment of user hearing dose.

The system may be one wherein the first wireless headphones are configured to download media content, and play the downloaded media content independently of any external source device.

The system may be one wherein the first wireless headphones include headset-operated volume controls.

The system may be one wherein the first wireless headphones include a customised hearing profile which is actioned in the first wireless headphones when providing the audio output.

The system may be one wherein the hearing dose record stored on the computer is associated with a unique user identifier. An advantage is that different hearing dose histories of different users can be prevented from being consolidated.

The system may be one wherein the unique user identifier distinguishes between different hearing dose protection levels, such as between adults and children or vulnerable people. An advantage is that vulnerable people can receive appropriate hearing dose protection.

The system may be one wherein a user profile for a vulnerable person by default is allocated a lower set of thresholds against which warnings and potential controls are initiated. An advantage is that vulnerable people can receive appropriate hearing dose protection.

The system may be one wherein the software includes a catalogue of wireless headphones and prompts the user to identify on the computer the first wireless headphones from the catalogue of wireless headphones, on initial connection of the first wireless headphones to the computer. An advantage is hearing dose can be measured accurately.

The system may be one wherein the first wireless headphones are able to switch between working with a compatible media player's protection functionality and working autonomously to provide hearing dose protection. An advantage is power saving on the first wireless headphones.

The system may be one wherein the hearing dose record on the first wireless headphones is recorded in the form of linear with energy. An advantage is power saving on the first wireless headphones.

The system may be one wherein the hearing dose record on the first wireless headphones is stored within a chipset of the first wireless headphones. An advantage is power saving on the first wireless headphones.

The system may be one wherein the software is executable to receive a dose history from the first wireless headphones, to receive an indication of a user-master-dose-history in which the received dose history is to be stored, and to store the received dose history in the indicated user-master-dose-history. An advantage is that the received records are available to the software to protect a user's hearing.

The system may be one wherein the first wireless headphones include a non-volatile storage and a real-time electronic clock, and wherein the quantified hearing dose record is stored in the non-volatile storage and includes time data obtained using the real-time electronic clock. An advantage is that the time of exposure is accurately recorded, which aids in hearing dose management as a function of time. An advantage is that dosage data is not lost, if the first wireless headphones battery runs out of charge.

The system may be one wherein the software is executable to receive a dose history from the first wireless headphones, the dose history lacking real-time clock data, to include real-time clock data in the received dose history, and to receive an indication of a user-master-dose-history in which the received dose history including the real-time clock data is to be stored, and to store the received dose history including the real-time clock data in the indicated user-master-dose-history. An advantage is that the time of exposure is accurately recorded, which aids in hearing dose management as a function of time.

The system may be one wherein the computer includes a real-time electronic clock, and identified headphones do not include a real-time electronic clock, wherein the computer is configured to record the time when the identified headphones are disconnected from the computer, and the computer is configured such that the next time the identified headphones are connected to the computer, a dose record in the headphones which lacks real-time clock data and that is uploaded to the computer, and which is not already present in the user-master-dose-history records, is added to the user-master-dose-history records, for a time period after the recorded time of the previous disconnection of the identified headphones from the computer. An advantage is that the time of exposure is accurately recorded, which aids in hearing dose management as a function of time.

The system may be one wherein in response to a lack of user-identity in the headphone dose records being encountered by the software executing on the computer, the software is executable to receive a dose history from the first wireless headphones, to receive an indication of a user-master-dose-history in which the received dose history is to be stored, and to store the received dose history in the indicated user-master-dose-history. An advantage is improved protection of user hearing.

The system may be one wherein quantifying hearing dose associated with the audio output includes sampling the audio output. An advantage is reduced power usage on first wireless headphones.

The system may be one wherein the computer provides on a display a graphical display of dose-history, and of a parallel dose-history in a logarithmic format.

The system may be one wherein when the first wireless headphones are in connection with the computer, the first wireless headphones sends dose samples to the computer, wherein the software executing on the computer provides a live dose data display on a display of the computer.

The system may be one wherein the previous minute of dose data is displayed as a radar-style sweep of 60 samples at 1 second intervals.

The system may be one wherein the system further includes second wireless headphones, the computer configured to communicate wirelessly with the second wireless headphones, wherein the second wireless headphones are configured to provide audio output, to quantify hearing dose associated with the audio output, and to record the quantified hearing dose on the second wireless headphones in a quantified hearing dose record during a second period when the second wireless headphones are not in wireless communication with the computer;

wherein the software is executable on the computer such that in response to the second wireless headphones being in wireless communication with the computer following the second period, the software is executable to receive from the second wireless headphones the quantified hearing dose record corresponding to the second period, and to store the received quantified hearing dose record in the hearing dose record on the computer. An advantage is that if audio output is provided when the second wireless headphones are not in wireless communication with the computer, a quantified hearing dose record is stored in a hearing dose record on the computer. An advantage is that a user's hearing can be protected based on use of wireless headphones which are not in wireless communication with the computer which stores the hearing dose record.

According to a second aspect of the invention, there is provided the first wireless headphones of any aspect according to the first aspect of the invention.

According to a third aspect of the invention, there is provided the software of any aspect according to the first aspect of the invention.

According to a fourth aspect of the invention, there is provided a system including a plurality of headphones (e.g.

including wired headphones e.g. USB wired headphones), a computer, and software stored on the computer, wherein the computer is configured to provide audio output to the plurality of headphones, wherein for each respective headphone the software is executable on the computer to quantify hearing dose associated with the audio output to the respective headphone, based on a sensitivity for the respective headphone, or based on headphone identification data of the respective headphone, and to store the quantified hearing dose in a hearing dose record on the computer.

An advantage is that a user's hearing can be protected accurately based on use of the plurality of headphones.

The system may be one wherein a sensitivity for a respective headphone is obtained from a received selection from a catalogue of different types of headphones including respective sensitivity characteristics, wherein the catalogue is stored on the computer. An advantage is that improved dose accuracy can be used to protect a user's hearing.

The system may be one wherein headphone identification data of the respective headphone is received from the respective headphone, or is obtained from a respective received selection from a catalogue of different types of headphones, wherein the catalogue is stored on the computer. An advantage is that improved dose accuracy can be used to protect a user's hearing.

The system may be one wherein the software is executable to monitor hearing dose during a first predefined period (e.g. a week) using the hearing dose record on the computer and to take remedial action (e.g. limit audio output level, or issue a warning) if a hearing dose during the first predefined period exceeds a first predefined level. An advantage is improved protection of user hearing.

The system may be one wherein the first predefined level is based on an integration of A-weighted energy content of the delivered acoustic signal, for example as modified by the acoustic characteristics of the headset and user combination often referred to as head-related-transfer-function (HRTF).

The system may be one wherein the software is executable to monitor hearing dose during a second predefined period (e.g. 24 hours) using the hearing dose record on computer and to take remedial action (e.g. limit audio output level, or issue a warning) if the hearing dose during the second predefined period exceeds a second predefined level. An advantage is improved protection of user hearing. In an example, the first predefined period is longer than the second predefined period.

The system may be one wherein the second predefined level is based on an integration of A-weighted energy content of the delivered acoustic signal, for example as modified by the acoustic characteristics of the headset and user combination often referred to as head-related-transfer-function (HRTF).

The system may be one wherein quantifying hearing dose associated with the audio output is performed using sampling of the audio output.

The system may be one wherein the computer is a portable device. An advantage is that the user's hearing can be protected for listening activities during mobile activities.

The system may be one wherein the computer that is a portable device is a smartphone, a tablet computer, a laptop computer, or a recreational media playing device.

The system may be one wherein the computer is a non-portable device, such as a desktop computer, a smart TV or a games console.

The system may be one wherein the software is an app downloadable from an app store, or is locked into the computer, or is incorporated into an operating system of the computer.

According to a fifth aspect of the invention, there is provided the software of any aspect according to the fourth aspect of the invention.

According to a sixth aspect of the invention, there is provided a system including a plurality of headphones (e.g. including wired headphones e.g. USB wired headphones), a computer, and software stored on the computer, the computer configured to communicate with the plurality of headphones, wherein the headphones are configured to provide audio output, to quantify hearing dose associated with the audio output, to record the quantified hearing dose in a quantified hearing dose record on the respective headphone, and to provide the quantified hearing dose record to the computer;

wherein the software is executable on the computer to store the received quantified hearing dose records in a hearing dose record on the computer.

An advantage is that a user's hearing can be protected accurately based on use of the plurality of headphones.

The system may be one wherein the software is executable on the computer to send a dose history record to a headphone, to initialise the local dose history record on the headphone.

The system may be one wherein a headphone is configured to receive a hearing dose record from the computer. An advantage is that the headphone can provide accurate hearing dose management.

The system may be one wherein the headphone is configured to monitor hearing dose during a first predefined period (e.g. a week) using the hearing dose record on the (e.g. wireless) headphones and to take remedial action (e.g. limit audio output level, or issue a warning) if a hearing dose during the first predefined period exceeds a predefined level. An advantage is improved protection of user hearing.

The system may be one wherein the predefined level is based on an integration of A-weighted energy content of the delivered acoustic signal, for example as modified by the acoustic characteristics of the headset and user combination often referred to as head-related-transfer-function (HRTF).

The system may be one wherein the headphone is configured to monitor hearing dose during a second predefined period (e.g. a day) using the hearing dose record on the (e.g. wireless) headphones and to take remedial action (e.g. limit audio output level, or issue a warning) if a hearing dose during the second predefined period exceeds a predefined level. An advantage is improved protection of user hearing. In an example, the first predefined period is longer than the second predefined period.

The system may be one wherein the predefined level is based on an integration of A-weighted energy content of the delivered acoustic signal, for example as modified by the acoustic characteristics of the headset and user combination often referred to as head-related-transfer-function (HRTF).

The system may be one wherein the respective headphones takes the remedial action, so as to meet regulatory or advisory requirements.

The system may be one wherein the issuing a warning includes one or more of providing audio cues, visual indications, voice messages, or haptic events.

The system may be one wherein the issuing a warning includes issuing a warning via the computing device when the computing device is in connection with the respective headphones.

The system may be one wherein a monitoring point is near to or at the headphone chip's output to an acoustic driver. An advantage is accurate assessment of user hearing dose.

The system may be one wherein a monitoring point is an in-ear microphone being used for feedback/hybrid monitoring, with a parallel path of specific filtering for dose-monitoring. An advantage is accurate assessment of user hearing dose.

The system may be one wherein quantifying hearing dose associated with the audio output is performed using sampling of the audio output.

The system may be one wherein the computer is a portable device. An advantage is that the user's hearing can be protected for listening activities during mobile activities.

The system may be one wherein the computer that is a portable device is a smartphone, a tablet computer, a laptop computer, or a recreational media playing device.

The system may be one wherein the computer is a non-portable device, such as a desktop computer, a smart TV or a games console.

The system may be one wherein the software is executable to synchronize the hearing dose record on the computer with a hearing dose record on respective headphones. An advantage is that a complete hearing dose record may be replicated, which means that the hearing dose record is not lost, if one of the computer or the respective headphones becomes inoperative or permanently unavailable.

The system may be one wherein any gaps in the dose records in either the computer or the respective headphones are filled by the synchronization.

The system may be one wherein any dose records that are present on the computer but which are not present on the respective headphones are copied from the computer to the respective headphones during the synchronization, for example for a user identity.

An advantage is that a user's hearing can be protected using the records when the respective headphones are not in communication with the computer.

The system may be one wherein any dose records that are present on the respective headphones but which are not present on the computer are copied from the respective headphones to the computer during the synchronization, for example for a user identity. An advantage is that a user's hearing can be protected using the records when the respective headphones are not in communication with the computer.

The system may be one wherein synchronisation is performed in the background. An advantage is that user activity using the respective headphones is not impacted.

The system may be one wherein the software is executable to receive a selection of a user, such that the synchronization is performed for a hearing dose record of the user on the computer, with a hearing dose record on the respective headphones. An advantage is that a hearing dose record on the respective headphones can be allocated to a user record on the computer.

The system may be one wherein the software is executable to receive an identity code in the respective headphones, and thereafter to use the received identity code such that the synchronization is performed for the hearing dose record of a user on the computer, with a hearing dose record on the respective headphones. An advantage is that a hearing dose record on the respective headphones is allocated to a user record on the computer. An advantage is that a user's hearing can be protected using the records when the respective headphones are not in communication with the computer.

The system may be one wherein synchronisation events include remapping records with differing sample periods.

The system may be one wherein the software is executable to configure respective headphones with a user identity code, such that hearing dose history records in the respective headphones which are received by the computer together with the user identity code, are collated in the computer into a user hearing history record corresponding to the user identity code. An advantage is that a hearing dose record on the respective headphones can be allocated to a user record on the computer.

The system may be one wherein the software is an app downloadable from an app store, or is locked into the computer, or is incorporated into an operating system of the computer.

The system may be one wherein a plurality of dose history records corresponding to a plurality of different users are stored on the computer.

The system may be one wherein each of the plurality of dose history records corresponds to a user profile which is established using the software.

The system may be one wherein only one dose history record corresponding to one user is present on the respective headphones.

The system may be one wherein the hearing dose record on the respective headphones is limited to a shorter period of time than the hearing dose record on the computer. An advantage is that available memory present in the respective headphones is dedicated to the most pertinent use in protecting the hearing of the one user.

The system may be one wherein the hearing dose record on the respective headphones is not limited to a shorter period of time than the hearing dose record on the computer. An advantage is that a complete hearing dose record may be replicated, which means that the hearing dose record is not lost, if one of the computer or the respective headphones becomes inoperative or permanently unavailable.

The system may be one wherein the hearing dose record on the respective headphones is for at least 7 days, or is for at least one month.

According to a seventh aspect of the invention, there is provided the headphones of any aspect according to the sixth aspect of the invention.

According to an eighth aspect of the invention, there is provided the software of any aspect according to the sixth aspect of the invention.

According to a ninth aspect of the invention, there is provided a system including a server and a plurality of computers configured to communicate with the server, the server configured to store a user's consolidated hearing dose history, wherein the computers are configured to communicate with the server, and to store hearing dose records corresponding to the user at the server in the user's consolidated hearing dose history. An advantage is that improved hearing protection for the user may be provided. This is because improved data on the user's hearing dose is available.

The system may be one wherein a user identity is used to ensure correct dose record allocation on a computer to the user's consolidated hearing dose history on the server.

The system may be one wherein the computers are configured to download the user's consolidated dose history from the server. An advantage is that improved hearing protection for the user may be provided. This is because improved data on the user's hearing dose is available.

The system may be one wherein a computer used by the user is configured to synchronize the user's dose history on the computer with the user's consolidated dose history stored at the server. An advantage is that improved hearing protection for the user may be provided. This is because improved data on the user's hearing dose is available.

The system may be one wherein the computers include a smartphone, or a plurality of smartphones, or a desktop computer, or a laptop computer, or a tablet computer.

The system may be one wherein the system includes a system of any aspect of the first, fourth or sixth aspects of the invention.

According to a tenth aspect of the invention, there is provided a server of any aspect of the ninth aspect of the invention.

Regarding the above software, the software may be provided as a computer program product.

In this document, the term "headphone" should be construed widely so as to include earbuds and earpieces, for example.

As the recommended limits for safe hearing are typically defined in terms of a diffused audio field which is closer to the levels prevailing around the user's head than the levels within the ear canal itself, assessment of hearing dose may include corrections between the monitoring point and the equivalent level in a diffused audio field. This complex relationship accounts for the acoustic characteristics of the headset and head in combination and is often referred to as the head-related-transfer-function (HRTF). Hence it is to be understood that wherever A-weighting is applied to the measured audio energy content, HRTF-correction is typically also applied, as would be clear to the skilled person.

Aspects of the invention may be combined.

BRIEF DESCRIPTION OF THE FIGURES

Aspects of the invention will now be described, by way of example(s), with reference to the following Figures, in which:

FIG. 4 shows an example audio data format, in which the linear data format is based on a 32 bit fixed-point representation of the audio energy content, based on decimal 1 representing 30 dBA SPL.

FIG. 5 shows an example rolling store of dose history.

FIG. 6 shows an example rolling store of dose history.

DETAILED DESCRIPTION

Figure 1:
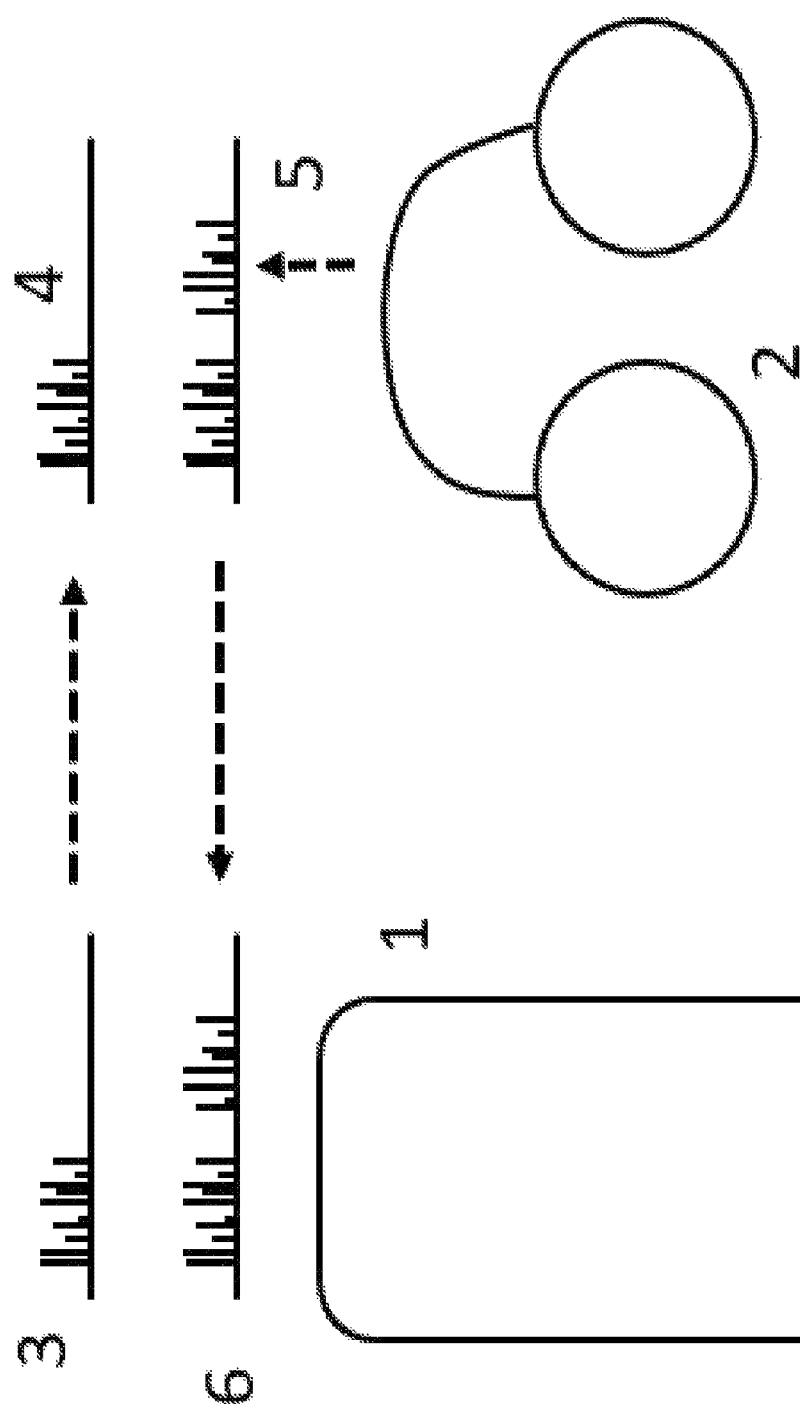
FIG. 1 shows an example configuration where a smartphone (1) executing the app is in connection with a wireless headphone (2). The smartphone app records a user-master-dose-history (3); the smartphone app synchronises the user-master-dose-history (3) with the headphone, transferring some or all of the user-master-dose-history to the headphone as a local-dose-history (4). Use of the headphone leads to an additional hearing dose (5) in the local record of the headphone (2), and later synchronisation loads the additional hearing dose (5) into the updated user-master-dose-history (6) of the smartphone (1).

Examples of the innovations overcome several use-case scenarios in which inadequate protection for headset users occurs and an increase in the possibility of noise-induced-hearing-loss (NIHL) arises. Applications include wireless or other digital headphones and any computing device such as a mobile handset, smartphone, tablet computer, laptop computer, desktop computer, smart TV, or computer, associated with the headphones. Wireless headphones include a battery power source.

Only basing controls and restrictions on hearing dose can be effective in preventing NIHL in practical situations of ambient noise. But the option of constraining sound levels below those that can ever lead to damage (e.g. always below 80 dBA SPL) is unworkable in many ambient noise environments, e.g. because such noise environments can be too noisy, and/or can result in an unsatisfactory listening experience. By continuously monitoring the effective energy being delivered to the ears, referred to here as hearing dose, exposures to higher levels can be safe as well as practical, as long as the exposure time is constrained, and the longer-term integrated exposure is kept within safe limits.

Safe levels of hearing dose are typically defined in terms of a period of one day or one week, the latter being given more emphasis in recent times. One interpretation of this approach is that the hearing dose received over the most recent defined period (e.g. 1 week) should not exceed the defined safe level before warnings are issued. For this approach to be practical and effective, a record of exposure over the defined period is essential. For a 1 week measurement period, a large sound exposure 6 days ago and a similar sound exposure 6 hours ago may have the same effect on the ears, but the difference is that the next time a large sound exposure can be safely permitted will be either in 1 day or in 7 days, respectively. Knowledge of hearing dose history rather than a single accumulation of hearing dose, makes this approach to regulating exposure possible.

Establishing ways of monitoring and controlling the media content audio level in the playing device has some challenges if it is to work as we intend. These are described for the following seven categories.

1) Headphone models have a large range of sensitivities. Any hearing protection scheme resident in the player, for an unknown headphone sensitivity (the acoustic output for a given electrical input), has to assume a particular headphone sensitivity: this approach becomes ineffective or even misleading if the actual headphone sensitivity is higher than assumed. To reduce this possibility, some standards (especially IEC 62368) prescribe a maximum permitted sensitivity for headphones intended for use with portable players; however, exceptions include devices for professional use and there is little clarity between what constitutes professional or non-professional use when considering a headphone product design.

2) Differences in frequency response between headphone models. Signals used to establish or verify headphone sensitivity are either pure tones (e.g. 500 Hz or 1000 Hz sine wave) or noise (e.g. Programme Simulation Noise—PSN as per EN 50332). Particular media content is likely to have differing frequency profiles to these test signals, which in conjunction with variations in headphone sensitivity profiles as a function of frequency will mislead the player's assessment of acoustic output, even when the headphone sensitivity is known according to standard test protocols.

3) A user's headphone (wired or wireless) could be used with multiple playing devices at periods throughout (for example) a day. Only portable players come within the remit of the above standards, and so users may not be protected for some periods (e.g. when using non-portable players) and overall any protection offered by (for example) a mobile handset would be rendered ineffective due to a hearing dose accumulated whilst connected to another source device (such as to a different portable device, or to a non-portable device, e.g. a desktop computer, or a smart TV, or a games console).

4) Some wireless listening devices are able to download media content and play the downloaded media content independently of any external source device (e.g. through integral MP3 players). These wireless listening devices cannot rely on the facilities of any external safe-listening function. We refer to this to as autonomous operation.

5) A media source device (e.g. a personal media player) may be unaware of processing employed in a sophisticated wireless headphone and hence may be unaware of the relationship between the player's output and the hearing dose received by the user. Three examples are now described.

(i) A simple example is headset-operated volume controls; although Bluetooth—based schemes such as "volume-sync" (often using Bluetooth's Audio/Visual Remote Control Profile—AVRCP) may be employed to ensure volume can be controlled either at the player end or headset end. Although volume-up or volume-down events are synchronised, the player volume change per step (dB) may be different to the headset volume change per step. This can result in a significant mismatch between the player's assessment of the headphone acoustic output and the actual amount.

(ii) Some portable media players may lack the ability to "volume-sync", and any operation of a headphone's volume setting will not be recognised by the playing device.

(iii) A more sophisticated example is of customised hearing profiles which are actioned in the headphone. Mobile phone based functions can determine a user's hearing threshold at different frequencies with reasonable accuracy, and these can be used to manipulate media sound to optimise the hearing experience, especially after some user hearing loss has occurred. Such profiles can be sideloaded onto the headphone so that the headphone's own processing elements can perform the same manipulation when playing media from sources other than the mobile phone. Such schemes disrupt any knowledge the player has of the relationship between its output and the headphone's acoustic output.

6) A person who enjoys listening to media content may use different listening devices as well as different playing devices throughout the day; but the one pair of ears needs the same protection throughout the day.

7) Playing devices or listening devices may be shared between friends, family members or adults and children. It is preferable that a protection scheme is able to distinguish between individuals, and between the possible need for different protection levels (e.g. as with H.870 for adults and for children).

Each of these seven categories may be addressed by the innovations described in this document.

Several approaches have been followed to protect the hearing of users of portable media players and other devices. Some measures have been introduced in response to the IEC/EN 62368 series of standards addressing portable media players. Such standards are applied nationally or supra-nationally (e.g. by the EU); sometimes a particular nation or region legislates using different versions of the standard such as IEC 62368-1:2018 or IEC 62368-1:2014.

All portable media players sold in the EU are required (according to EN 62368-1:2014) to constrain the output level until the user has acknowledged a warning at least once every 20 hours of playing time. Even after the acknowledgement, the output is constrained to a (higher) level. Output can be defined in terms of voltage, digital level (as per dBFS) or if the headphone characteristic is somehow known, in terms of acoustic output. A constraint is defined as when playing a defined signal with particular dynamic and spectral characteristics (PSN).

One peculiarity of this standard (EN 62368-1:2014) when using wired listening devices is for a 32R load to be used. At least one smartphone manufacturer employs a resistance-sensing scheme so that the output stage gain can be increased with high-resistance loads or reduced with low resistance loads; this delivers approximately constant power with varying loads, but at very different voltage levels. With the test defined for a 32R load, at least one model of smartphone will fail to constrain acoustic power output when higher impedance headphones are used.

From 20 Dec. 2020 under IEC 62368-1:2018, all portable media players sold in the EU and all new models of portable media players in North America have to follow the above standard (IEC 62368-1:2014), but are now given the recommended option to use hearing-dose-based monitoring. Instead of referencing the output level as the criterion to limit or not, the standard uses the integration of A-weighted energy content of the delivered acoustic signal. This is defined in terms of PSN content.

H.870 is the ITU's standard which is at present voluntary rather than being mandatory in particular regions, as with IEC 62368-1:2018. Nevertheless H.870 improves the measures used to protect against NIHL through education and usage feedback, as well as providing specific warnings when thresholds are crossed.

Apple have introduced hearing dose based functionality in their iOS 13's Health App framework. This can estimate hearing dose for compatible and known (characterised) listening devices connected or linked to suitable iPhone models. It can also determine ambient sound-dose from iWatch (6.0 onwards).

Some wireless headphones provide integral hearing-dose monitoring functionality (eg Beyerdynamic Aventhos) when used in conjunction with a companion App running on a smartphone.

Westone dbTracker (2018 and earlier; no longer available) provided a calibration tool to work with earbuds; this informed a companion app of the earbud sensitivity which enabled hearing dose to be estimated.

The HearAngel App available for Android systems has an in-built catalogue of listening devices and prompts the user to select the appropriate listening device on connection. This gives the App the ability to estimate the hearing dose being delivered to the user.

Disclosure of Implementations

Advantages of the innovations include that they can greatly extend the effectiveness of hearing-dose monitoring and associated protection in a variety of use-cases, such as for different configurations of devices at any one time or for different configurations of devices at different times, for different levels of capability of the devices used, and/or for different users. Implementations make use of the hearing dose history, rather than a simple single representation of all past hearing dose. Implementations ideally employ two compatible entities: an app resident on a smartphone or an equivalent functionality resident in another computing device, and a wireless headphone with dose-monitoring capabilities, being in communication with the app or with the equivalent functionality resident in the other computing device. One aspect of an implementation is the ability to work within many configurations of media playing devices and listening devices (such as headphones). Advantages can be understood from the following sections which describe various examples or aspects.

1) Autonomous operation. A wireless headphone playing streamed content or downloaded media content should have its own ability to protect the user from excessive hearing dose when there is a lack of an associated portable media player with protection functionality. Dose-monitoring functionality within the headphone and communication of dose increments to a connected smartphone with a suitable app is possible, but this alone is ineffective when such a connection is not available. One aspect of this innovation is to not only embed such functionality within the headphone, but for headphones to be able to switch between working with a compatible media player's protection functionality and working autonomously. When in autonomous mode, sufficient functions which could reside in the smartphone app are enabled within the headphones, with the ability to monitor dose, and determine the various thresholds for warnings or actions e.g. in accordance with a particular standard (e.g. H.870), issue suitable messaging to the user through voice or tones and optionally visual or haptic indications, and optionally take action such as reduce output levels. In an example, a local dose history record obtained using (e.g. suitable) sampling is established within the headphone chipset.

2) Dose synchronisation. When connection is re-established with a device such as a smartphone executing an app, the local dose history record within the headphone may be synchronised with a user-master dose history record resident on the smartphone. Any gaps in the dose records in either device (the smartphone or the headphones) may be filled by the synchronization process. On the headphone side, this improves the quality of notifications given to the user and any automatic protection being employed. On the smartphone side, this allows a longer record than may be present on the headphone and facilitates augmentation of the record on the smartphone from other sources. Dose synchronisation can be arranged to run in the background; if the communication bandwidth (e.g. Bluetooth channels) (e.g. between the smartphone and the headphones) is limited, synchronisation may take several minutes and so background operation can avoid user-waiting and creating user frustration. See also the 'Time-synchronisation' and 'Dose-history-record editing' sections.

3) User identity. Whilst headphones are connected to an app executing on a computer (e.g. a smartphone), where the app is configured to communicate with the headphones, a user is able to allocate use of a headphone to an individual such as a child or a family member, such as through the use of a downloaded identity code. Synchronisation at this time will ensure that any residual dose history in the headphone is uploaded to the computer into an appropriate user-master-dose-history record, and then the appropriate user-master-dose-history can be downloaded to the headphone ready for the new user. Any subsequent synchronisation events can allow the app to utilise an identity code resident in the headphone to allocate the headphone dose history to the appropriate user-master-dose-history record on the computer (e.g. a smartphone); several dose history records can be co-resident on the computer (e.g. smartphone), but typically due to limited storage, only one record may be present on the headphones at a time.

4) Dose-history record editing. The app executing on a computer (e.g. a smartphone) and configured to communicate with headphones can offer an editing facility to reallocate periods of hearing dose history amongst user-master-dose-history records. Suitable protection (e.g. user authentication) can protect against inappropriate changes such as by a child. One purpose of this reallocation is to allow a user to adjust for situations where there is imperfect or no time-synchronisation between (for example) the app on a computer (e.g. smartphone) and a headphone chipset with no real-time clock; for the adjustment, the uploaded history record from the headset to the computer (e.g. smartphone) can be provided with an improved (e.g. real-time based) time record, and inserted in the most appropriate time slot in the user-master-dose-history records. This process can also be activated whenever a lack of user-identity is encountered in the headphone dose records. This process can also facilitate additions of ambient-noise events the ears are exposed to when not using headphones, such as 3 hours at a concert, or 2 journeys on noisy public transport; such additions can improve the overall appropriateness of warnings and control measures through their being based on an improved assessment of exposure.

5) Multiple Headphones. When a person uses multiple headphones during a period, the app configured to communicate with the headphones uses an available method to estimate the delivered hearing dose through each headphone (e.g. through each type of headphone). This can include dose-estimation within the app configured to communicate with the headphones based on knowledge of sensitivity for the headphone in use at any given time. If analogue-wired headphones are in use, headphone identification may involve user-selection from a catalogue of different types of headphones with sensitivity and other characteristics included. If wired-digital or wireless headphones are in use, selection may be from a catalogue of types; the selection could be automatically determined from an available name, type or code or data resident in the headphone, or the selection could be made based on a digital communication from the connected headphone. Headphones with the capability of storing a dose-history, providing warnings and providing output control may receive the consolidated dose-history based on use of all previous devices used by the user.

6) Multiple Players. When a particular headphone with a local dose history storing capability is connected to different players, such as first to a smartphone, then to a laptop, then to a video game console, then to non-portable media-playing equipment then back to the smartphone, the particular headphone can gather dose-history during the whole period and utilise the overall history to implement appropriate warnings or control measures. On connection to a smartphone with an app configured to communicate with the headphones, or to another device with the equivalent capability (e.g. a desktop computer), dosage record synchronisation ensures the user's full dose-history is consolidated at the smartphone, or at the other device with the equivalent capability (e.g. a desktop computer).

7) Dose-History Record. A scalable scheme with variations in sample rate, history length, and data resolution can be employed. For wireless headphones capable of autonomous operation, non-volatile storage and a form of real-time clock are preferably present in the headphones so as to survive a drained battery event such that subsequent recordation of dosage in a dose history record can be provided. Typically, dose sampling could be performed e.g. at 5-minute intervals, and if sufficient storage were available, e.g. 30 days of history could be stored. A smartphone's app configured to communicate with headphones could hold many user's records for extended periods of history, e.g. for years, stored at 5-minute intervals. Synchronisation events can include remapping records with differing sample periods; for example, a smartphone may have 5-minute sample periods, whilst one headphone may use 10 minute sample periods and another may use 15 minute sample periods; moving data records from headphone to smartphone could involve accumulating data obtained over multiple different sampling periods, whilst moving data records from a smartphone to a headphone could involve consolidation in respect of multiple different sampling periods. Fractional rather than integer multiples of different sampling periods are also possible. The H.870 regulation is based on a 7-day period: for the purposes of implementing warnings and controls whilst possibly in autonomous operation, the headphone needs to hold at least 7 days of dose history. An advantage to extending the 7 days to a longer period is when synchronisation events are more sparse than weekly, for example a one month storage period could be used.

8) Dose-Sample. A single dose-sample based on a particular period or sampling rate (such as every 5 minutes) may be used to represent the average hearing dose during that period. For computational convenience this may be recorded in the form of linear with energy rather than logarithmic (eg dBA), greatly simplifying remapping between different dose-history-record structures and formats.

9) In the app configured to communicate with headphones and executing on a computer (e.g. smartphone), when graphical display of dose-history is provided, a parallel dose-history in a logarithmic format can advantageous. For example, the previous 7 days dose record could be displayed as 7×24 hours×12 samples-per-hour=2016 records at 5 minute intervals; the previous 12 hours dose record could be displayed as 144×5 minute samples.

10) Live Dose Data. Whilst connected to the smartphone executing the app configured to communicate with headphones, in which the app provides a live dose data display, a dose-gathering headphone can send (e.g. 1 second) dose samples to the smartphone to facilitate a live display. For example, the previous minute of dose data could be displayed as a radar-style sweep of 60 samples at 1 second intervals. These samples could be sent as dBA or logarithmic format (helping the smartphone to limit stored data size), or as linear-energy format (helping the headphone to process data using lower energy consumption). Consolidation in the smartphone into (e.g. 1 minute) samples can help live-dose-data displays, such as for displaying the previous hour of dose data. Alternatively, the headphone can consolidate locally and send e.g. 1 minute and e.g. 1 second samples live, whilst also maintaining the local-dose-history record (of say 5-minute samples) to be uploaded during synchronisation events.

11) Child Operation. User-profiles can be established in the app configured to communicate with headphones, allowing multiple user-master-dose-history records to coexist. Any user can be designated a child (or in H.870 terms, a vulnerable person). Suitable access security measures (e.g. user authentication) can be implemented (e.g. PIN code). A user profile for a vulnerable person can by default be allocated a lower set of thresholds against which warnings and potential controls can be initiated. H.870 refers to reference levels for vulnerable persons being 5 dBA lower than for adults. Additional features can be included, such as maximum levels, listening time limits, customised warning levels.

12) Automatic Protection. Rather than using warnings to prompt users to reduce the volume to avoid NIHL, an automatic protection scheme can be included within the headphone with dose-gathering capability, or in an app configured to communicate with headphones and executing on a computer (e.g. smartphone) in connection with the headphones. With access to dose-history and the dynamics of dose-accumulation, an algorithm can be employed to predict when safe levels are likely to be reached, and implement volume reductions to ensure reasonable safe-use periods remain. This approach can employ user-selected parameters related to usage patterns (e.g. a usage pattern is known to be many hours of medium dose rate use, or a few hours of heavy dose rate use, for example). The automatic protection scheme can employ past usage patterns based on averages over a week, obtained on previous occasions. The automatic protection scheme operation can be made optional, and it can be made non-optional, for example with child-profiles. Automatic protection for very high level events (eg 100 dBA) are best managed with rapid dose sampling such as at a 1 second rate.

13) Dose Gathering. Any of several methods can be used to estimate the delivered hearing dose to users. Some trade-off can ensure appropriate optimisation between measured dose accuracy and battery life. For a headphone with dose-monitoring functionality and without feedback or hybrid forms of automatic noise control (ANC), an appropriate monitoring point is near to or at the headphone chip's output to the acoustic driver. Using this monitoring point will include the effect of any in-chip processing mentioned earlier. Where hybrid or feedback ANC functions are operative, the chip output will experience higher drive levels than necessary for the intended media playing as significant noise cancellation signals can be involved. In this configuration, the optimum monitoring point can be the in-ear microphone being used for feedback/hybrid monitoring, with a parallel path of specific filtering for the dose-monitoring process. Standard filtering and magnitude-derivation and averaging or decimation can be employed as with any noise meter instrument or app. Filtering can be based on fast-Fourier-transforms (FFT), digital time-domain filtering or any other convenient technique. Sampling can be employed where accuracy is not overly compromised, so as to reduce processing drain on headphone batteries.

14) Multiple smartphones. An individual may have multiple smartphones; the user-master-hearing-dose record can be replicated on each smartphone. With the use of a user identity, because a headphone in use will only be used by one person at any time, therefore an accumulated dose can be correctly allocated to a respective history record based on the respective user identity. If one phone is lent and is used by another family member or household member, when in use, a respective user identity may be used to ensure correct dose allocation to a respective dose history record, for example even when two phones of an individual are in use simultaneously. In an example, a user's consolidated dose history is stored at a server, and smartphones used by the user are configured to communicate with the server, and to store dose records corresponding to the user at the server in the user's consolidated dose history stored at the server. The smartphones used by the user may be configured to download the user's consolidated dose history from the server. A smartphone used by the user may be configured to synchronize the user's dose history on the smartphone with the user's consolidated dose history stored at the server.

15) Time-synchronisation. Some headphone chipsets do not have real-time clocks, and so the recording on such headphones of local hearing dose history relies on estimates of elapsed time. Whenever a connection is established with an app executing on a computer (e.g. smartphone), the app configured to communicate with the headphones, time synchronisation between the headphones and the smartphone can ensure the elapsed time on the headphone is linked to real-time. This improves the automatic synchronisation of dose-histories between the app and headphone. In an example, a computer (e.g. smartphone), which includes a real-time clock, records the time when identified headphones are disconnected from the computer, and then the next time the identified headphones are connected to the computer, the dose record in the headphones which lacks real-time clock data and that is uploaded to the computer, and which is not already present in the user-master-dose-history records, may be added to the user-master-dose-history records, for a time period after the recorded time of the previous disconnection of the identified headphones from the computer.

In an example configuration, a smartphone (1) executing the app is in connection with a wireless headphone (2). The smartphone app records a user-master-dose-history (3); the smartphone app synchronises the user-master-dose-history (3) with the headphone, transferring some or all of the user-master-dose-history to the headphone as a local-dose-history (4). Use of the headphone leads to an additional hearing dose (5) in the local record of the headphone (2), and later synchronisation loads the additional hearing dose (5) into the updated user-master-dose-history (6) of the smartphone (1). An example is shown in FIG. 1.

Figure 2:
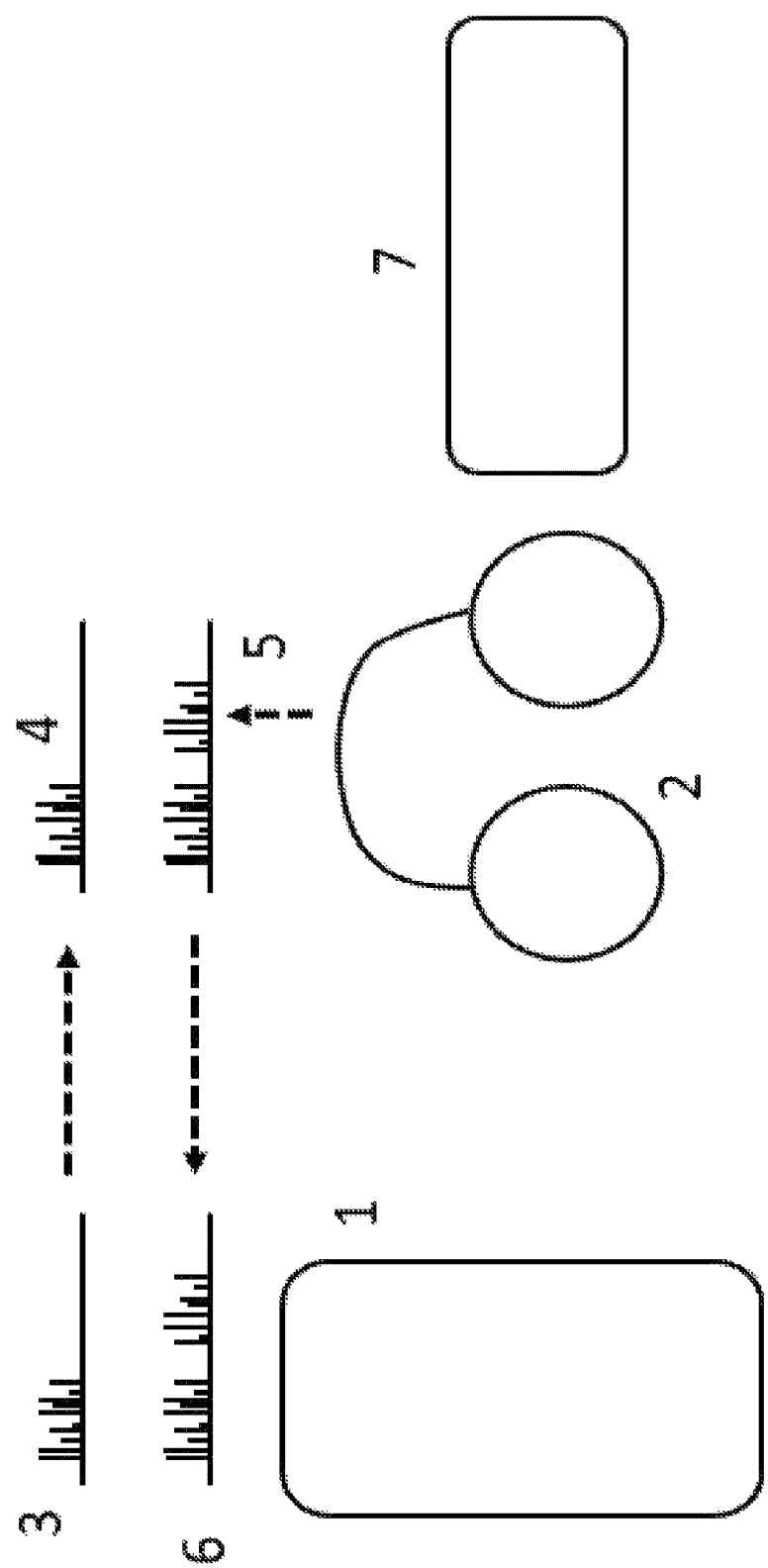
FIG. 2 shows an example configuration where a headphone (2), having previously synchronised with a smartphone (1) such that the headphone (2) acquired a local-dose-history (4), is used with a non-portable playing device (7) and an additional hearing dose (5) is recorded at the headphone (2); a synchronisation loads the additional hearing dose (5) into the updated user-master-dose-history (6) of the smartphone (1).

In an example configuration, a headphone (2), having previously synchronised with a smartphone (1) such that the headphone (2) acquired a local-dose-history (4), is used with a non-portable playing device (7) and an additional hearing dose (5) is recorded at the headphone (2); a synchronisation loads the additional hearing dose (5) into the updated user-master-dose-history (6) of the smartphone (1). An example is shown in FIG. 2.

Figure 3:
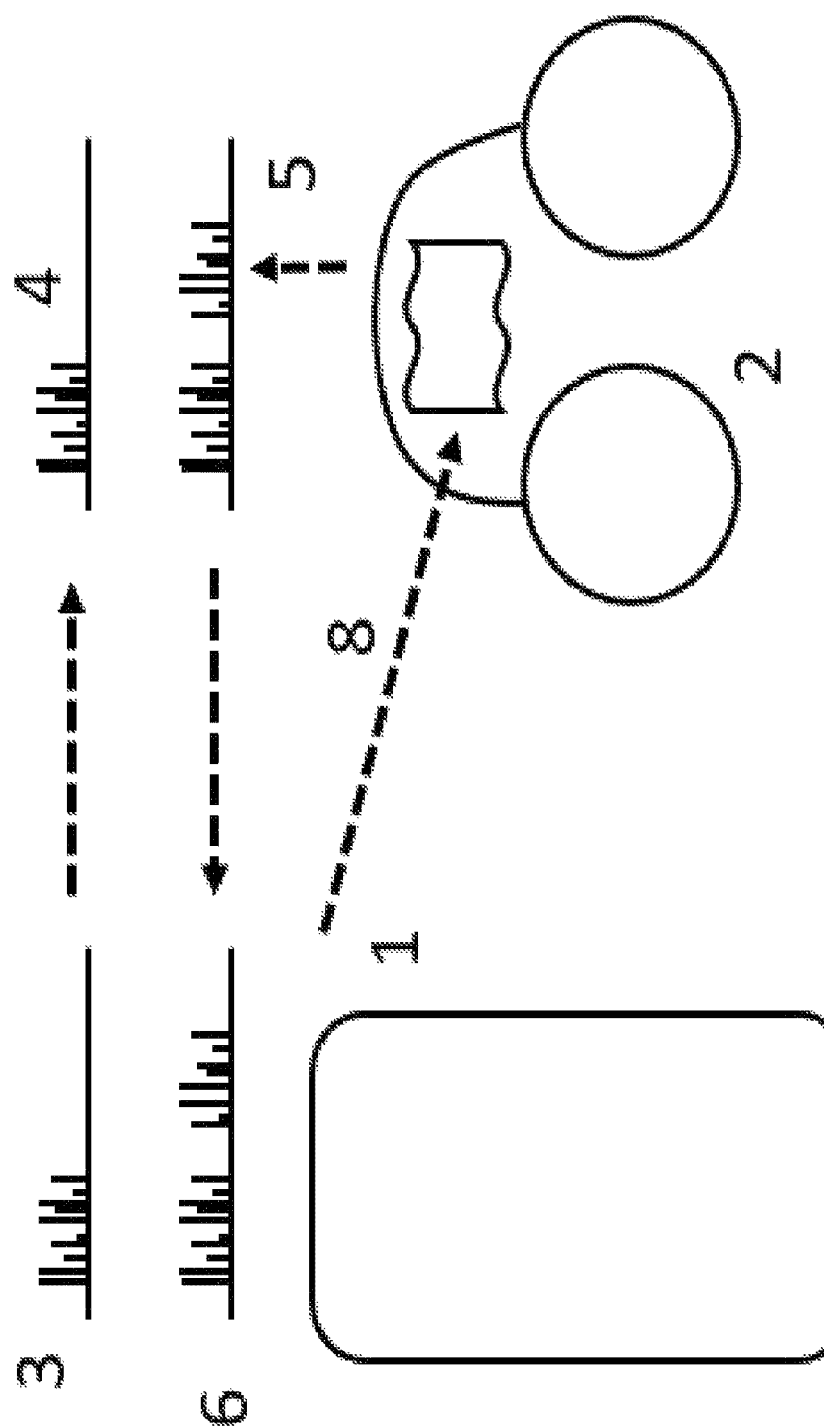
FIG. 3 shows an example configuration where a headphone (2), having previously synchronised with a smartphone (1) such that the headphone (2) acquired a local-dose-history (4), has media downloaded (8) which plays on the headphone whilst a connection with the smartphone is no longer available, leading to an additional hearing dose (5) in the local record; later synchronisation loads the additional hearing dose (5) into the updated user-master-dose-history (6) of the smartphone (1).

In an example configuration, a headphone (2), having previously synchronised with a smartphone (1) such that the headphone (2) acquired a local-dose-history (4), downloads media (8) which plays on the headphone whilst a connection with the smartphone is no longer available, leading to an additional hearing dose (5) in the headphone's local record; later synchronisation loads the additional hearing dose (5) into the updated user-master-dose-history (6) of the smartphone (1). An example is shown in FIG. 3.

Concepts

1. A hearing dose management system comprising a multiplicity of devices, the devices having the ability to play or stream audio media through listening devices such as headphones and to monitor or estimate the hearing dose delivered through the listening devices to users, and store history records of the hearing dose in several devices, and synchronise hearing dose history records between devices so as to form a complete record of a user's hearing dose history.

2. A system of Concept 1 where a device such as a smartphone with a resident app provides the ability to collate hearing dose histories from various listening devices which have the ability to monitor or estimate hearing dose.

3. A system of Concept 2 where the device such as a smartphone is able to estimate and to collate the hearing dose of listening devices such as headphones which do not have the ability to monitor or estimate hearing dose.

4. A system of Concept 2 where a listening device such as a headphone with the ability to monitor or estimate hearing dose is able to form a local dose history record.

5. A system of Concept 4 where the device such as a smartphone is able to send a dose history record to the listening device to initialise the local dose history record.

6. A system of Concept 4 or Concept 5 where the listening device and device such as a smartphone are able to communicate, wherein the local dose history record is transferred to the device such as a smartphone and collated to form a complete record of a user's hearing dose history.

7. A system of any of Concepts 1 to 6, where a listening device with the ability to monitor or estimate hearing dose and to form a local dose history record, is able to issue warnings to the user, either by its own functionality such as audio cues, visual indications, voice messages, or haptic events, or via the device such as a smartphone with the ability to provide visual messages or cues or any other means to inform the user.

8. A system of any of Concepts 1 to 7 where a listening device with the ability to monitor or estimate hearing dose and to form a local dose history record, is able to control the output level so as to avoid excessive hearing dose, even when out of communication with any other device.

9. A system of any of Concepts 1 to 8 where a listening device with the ability to monitor or estimate hearing dose and to form a local dose history record, is able to control the output level so as to avoid excessive hearing dose based on the local dose history record so as to meet any regulatory or advisory requirements.

10. A system of any of Concepts 1 to 9, where the device such as a smartphone is able to configure any listening device which has the ability to monitor or estimate hearing dose and to form a local dose history record with a user identity code so that local hearing dose history records can be appropriately collated in the device such as a smartphone into the correct user hearing history record.

Modes for Implementation

Protection for human hearing may be obtained through a combination of education, information, ease of taking effective action, and using automatic protection.

Implementation may be carried out through integration of suitable functionality within headphone chipsets, coupled with provision of an app on a smartphone frequently used by the headphone user. Implementation aspects within the app may provide helpful and complete communication with the user; implementation aspects within the chipset may acquire accurate dose data and provide the opportunity for protection control. In an implementation, the flexibility offered for users in complex, multi-device, multi-activity lifestyles may be best achieved when as many devices as possible are used in the implementation.

Industrial Applicability

Implementation of the innovations within the chipsets of wireless and other digital headphones (including listening devices such as earbuds) may be important due to the reasons outlined in the seven categories described above.

With the limited resources and capacity available within typical headphone chipsets, as well as the limited channels for communication and user input that headphones offer, the use of an external device such as a smartphone executing an app is of great benefit to users. With the app on the smartphone available, at least part of the time, we can utilise contributions from other devices such as analogue headphones, or a user's estimations for non-headphone noise events.

More generally, the smartphone app functionality described, could be available from apps in app stores, be locked onto the smartphone and delivered to a user without the ability to remove it, or be incorporated into the operating system of the smartphone. The functionality can be incorporated into an app for similar functionality and delivered in any of these ways. Thus any of the operating system supplier, smartphone manufacturer, smartphone regional distributor, associated app creator and the final user, can be the agent who decides to implement the solution.

The headphone functionality can be adapted for different headphone chipsets, including those with greater or lesser processing and storage resources, and other functionality such as ANC or hearing optimisation.

A system including at least a computer executing an app, and headphones in communication with the computer, is one for ensuring the noise exposure from listening to media content in a variety of situations and configurations of devices can be appropriately accounted for when informing users of hearing loss risks or when automatically constraining volume levels.

Hearing Dose Record Examples

Quantified hearing dose records, and/or hearing dose records, may be recorded in accordance with the following examples. In an example, quantified hearing dose records, and/or hearing dose records, include a minimum time resolution of one second or less. In an example, quantified hearing dose records, and/or hearing dose records, include a plurality of time resolutions, each with a corresponding time period: an advantage is that hearing dose protection may be provided independently for each respective time resolution, each with its corresponding time period. In an example, quantified hearing dose records, and/or hearing dose records, include a linear representation of energy content, and/or a logarithmic representation of energy content: an advantage when both representations are included is that the linear representation may be selected to reduce energy usage in data processing, which reduces the use of battery charge in a portable device, or which reduces the use of battery charge in headphones including a battery.

A linear representation of audio energy content simplifies dose aggregation, whilst user-intelligibility may be improved with logarithmic representation. An example for the linear data format is based on a 32 bit fixed-point representation of the audio energy content, based on decimal 1 representing 30 dBA SPL. This allows any value in range of 30 to 126.3 dBA SPL to be represented. An example is shown in the table in FIG. 4.

To optimise the time-resolution of recent dose-contributions and the need for a reasonably long local dose history for effective protection against NIHL within the constraints of limited data-storage, the example scheme shown here can be employed. In this example, hearing dose contributions in each second are saved for 30 seconds in the above linear data format; this is a rolling store of the most recent 30 seconds of dose history as in the left hand side of the table shown in the example of FIG. 5. Every 30 seconds, the data recorded at 1 second time intervals are averaged to represent a dose history record of the recent 30 seconds; thirty of these 30-second averaged records form a rolling store of the most recent 15 minutes, as in the right-hand side of the table shown in the example of FIG. 5.

Every 15 minutes, the average of the data recorded at 30 second intervals is used to form a record which contributes to the next rolling history store of 32 records, recorded at 15 minute intervals, covering the most recent 8 hour period, as shown in the left hand side of the table shown in the example of FIG. 6. Every 8 hours, the average of the data recorded at 15 minute intervals, is recorded to provide a record in a rolling history store of 21 records covering the recent 7-day period, as shown in the right-hand side of the table shown in the example of FIG. 6.

In this example, in total, 113 records of 32 bit values covers the 7-day period, including appropriate time-resolution for recent and distant time periods.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A system including first wireless headphones, a computer, and software stored on the computer, the computer configured to communicate wirelessly with the first wireless headphones, wherein the first wireless headphones are configured to provide audio output, to quantify hearing dose associated with the audio output, and to record the quantified hearing dose on the first wireless headphones in a quantified hearing dose record during a first period when the first wireless headphones are not in wireless communication with the computer;

wherein the software is executable on the computer such that in response to the first wireless headphones being in wireless communication with the computer following the first period, the software is executable to receive from the first wireless headphones the quantified hearing dose record corresponding to the first period, and to store the received quantified hearing dose record in a hearing dose record on the computer;

wherein the software is executable to synchronize the hearing dose record on the computer with a hearing dose record on the first wireless headphones, and wherein the software is executable to receive an identity code in the first wireless headphones, and thereafter to use the received identity code such that the synchronization is performed for the hearing dose record of a user on the computer associated with the received identity code, with a hearing dose record on the first wireless headphones.

2. The system of claim 1, wherein during the first period the first wireless headphones provide the audio output using media including audio, the media stored on the first wireless headphones.

3. The system of claim 1, wherein during the first period the first wireless headphones provide the audio output using audio data provided by a playing device in wireless communication with the first wireless headphones, in which the playing device is not the computer.

4. The system of claim 1, wherein any dose records that are present on the computer but which are not present on the first wireless headphones are copied from the computer to the first wireless headphones during the synchronization.

5. The system of claim 1, wherein the software is executable to receive a selection of a user, such that the synchronization is performed for a hearing dose record of the user on the computer, with a hearing dose record on the first wireless headphones.

6. The system of claim 1, wherein synchronisation events include remapping records with differing sample periods.

7. The system of claim 1, wherein the software is executable to configure the first wireless headphones with a user identity code, such that hearing dose history records in the first wireless headphones which are received by the computer together with the user identity code, are collated in the computer into a user hearing history record corresponding to the user identity code.

8. The system of claim 1, wherein the software is an app downloadable from an app store, or is locked into the computer, or is incorporated into an operating system of the computer.

9. The system of claim 1, wherein the hearing dose record on the first wireless headphones is limited to a shorter period of time than the hearing dose record on the computer.

10. The system of claim 1, wherein the hearing dose record on the first wireless headphones is for at least 7 days, or is for at least one month.

11. The system of claim 1, wherein the first wireless headphones are configured to monitor hearing dose during a first predefined period using the hearing dose record on the first wireless headphones and to take remedial action if a hearing dose during the first predefined period exceeds a first predefined level.

12. The system of claim 11, wherein the first wireless headphones takes the remedial action, even when out of communication with any other device.

13. The system of claim 11, wherein the first wireless headphones are configured to monitor hearing dose during a second predefined period using the hearing dose record on the first wireless headphones and to take remedial action if the hearing dose during the second predefined period exceeds a second predefined level.

14. The system of claim 1, wherein the hearing dose record stored on the computer is associated with a unique user identifier.

15. The system of claim 14, wherein the unique user identifier distinguishes between different hearing dose protection levels, such as between adults and children or vulnerable people.

16. The system of claim 1, wherein the software includes a catalogue of wireless headphones and prompts the user to identify on the computer the first wireless headphones from the catalogue of wireless headphones, on initial connection of the first wireless headphones to the computer.

17. The system of claim 1, wherein the software is executable to receive a dose history from the first wireless headphones, the dose history lacking real-time clock data, to include real-time clock data in the received dose history, and to receive an indication of a user-master-dose-history in which the received dose history including the real-time clock data is to be stored, and to store the received dose history including the real-time clock data in the indicated user-master-dose-history.

18. First wireless headphones, being part of a system including the first wireless headphones, a computer, and software stored on the computer, the computer configured to communicate wirelessly with the first wireless headphones, wherein the first wireless headphones are configured to provide audio output, to quantify hearing dose associated with the audio output, and to record the quantified hearing dose on the first wireless headphones in a quantified hearing dose record during a first period when the first wireless headphones are not in wireless communication with the computer;

wherein the software is executable on the computer such that in response to the first wireless headphones being in wireless communication with the computer following the first period, the software is executable to receive from the first wireless headphones the quantified hearing dose record corresponding to the first period, and to store the received quantified hearing dose record in a hearing dose record on the computer;

wherein the software is executable to synchronize the hearing dose record on the computer with a hearing dose record on the first wireless headphones, and wherein the software is executable to receive an identity code in the first wireless headphones, and thereafter to use the received identity code such that the synchronization is performed for the hearing dose record of a user on the computer associated with the received identity code, with a hearing dose record on the first wireless headphones.

19. A system including a plurality of headphones, a computer, and software stored on the computer, the computer configured to communicate with the plurality of headphones, wherein the headphones are configured to provide audio output, to quantify hearing dose associated with the audio output, to record the quantified hearing dose in a quantified hearing dose record on the respective headphones, and to provide the quantified hearing dose record to the computer;

wherein the software is executable on the computer to store the received quantified hearing dose records in a hearing dose record on the computer;

wherein the software is executable to synchronize the hearing dose record on the computer with a hearing dose record on the respective headphones, and wherein the software is executable to receive an identity code in the respective headphones, and thereafter to use the received identity code such that the synchronization is performed for the hearing dose record of a respective user on the computer associated with the received identity code, with a hearing dose record on the respective headphones.

20. The system of claim 19, wherein the plurality of headphones include wired headphones.

21. The system of claim 19, wherein the plurality of headphones include USB wired headphones.

22. A system including first wireless headphones, a computer, and software stored on the computer, the computer configured to communicate wirelessly with the first wireless headphones, wherein the first wireless headphones are configured to provide audio output, to quantify hearing dose associated with the audio output, and to record the quantified hearing dose on the first wireless headphones in a quantified hearing dose record during a first period when the first wireless headphones are not in wireless communication with the computer;

wherein the software is executable on the computer such that in response to the first wireless headphones being in wireless communication with the computer following the first period, the software is executable to receive from the first wireless headphones the quantified hearing dose record corresponding to the first period, and to store the received quantified hearing dose record in a hearing dose record on the computer;

wherein the hearing dose record stored on the computer is associated with a unique user identifier;

wherein the unique user identifier distinguishes between different hearing dose protection levels.

\* \* \* \* \*